United States Patent [19]

Lind et al.

[11] Patent Number: 5,188,142
[45] Date of Patent: Feb. 23, 1993

[54] SWIVEL VALVE

[75] Inventors: John R. Lind, Burnsville; Robert L. Swanson, Blaine, both of Minn.

[73] Assignee: Survival Engineering, Inc., Burnsville, Minn.

[21] Appl. No.: 826,106

[22] Filed: Jan. 27, 1992

[51] Int. Cl.⁵ ............................................. F16K 15/20
[52] U.S. Cl. ................................... 137/223; 137/539; 137/580; 441/41
[58] Field of Search ...................... 137/223, 539, 580; 441/41, 92–101

[56] References Cited

U.S. PATENT DOCUMENTS 3,122,181  2/1964  Hebenstreit .................... 441/100 X
4,413,645  11/1983  Seabase ............................. 137/223
4,832,835  4/1989  Chu .................................. 137/580 X

FOREIGN PATENT DOCUMENTS 1142008  2/1969  United Kingdom ................ 137/223

Primary Examiner—Robert G. Nilson
Attorney, Agent, or Firm—Zarley, McKee, Thomte, Voorhees & Sease

[57] ABSTRACT

A swivel valve has a valve body having an elongated bore with both the valve body and the bore having first and second ends. A gas or fluid port is located in the first end of the valve body and is in communication with the first end of the bore. A passageway extends from the second end of the bore and terminates in an annular groove extending around the outer surface of the valve body. A swivel connection is rotatably mounted on the valve body around said annular groove and has a passageway in communication with the annular groove. Sealing rings are located on opposite sides of the annular groove to prevent the escape of gas from the groove to the atmosphere between the swivel connection and the outer surface of the valve body, and to equalize the gas pressure forces on the swivel connection.

3 Claims, 1 Drawing Sheet

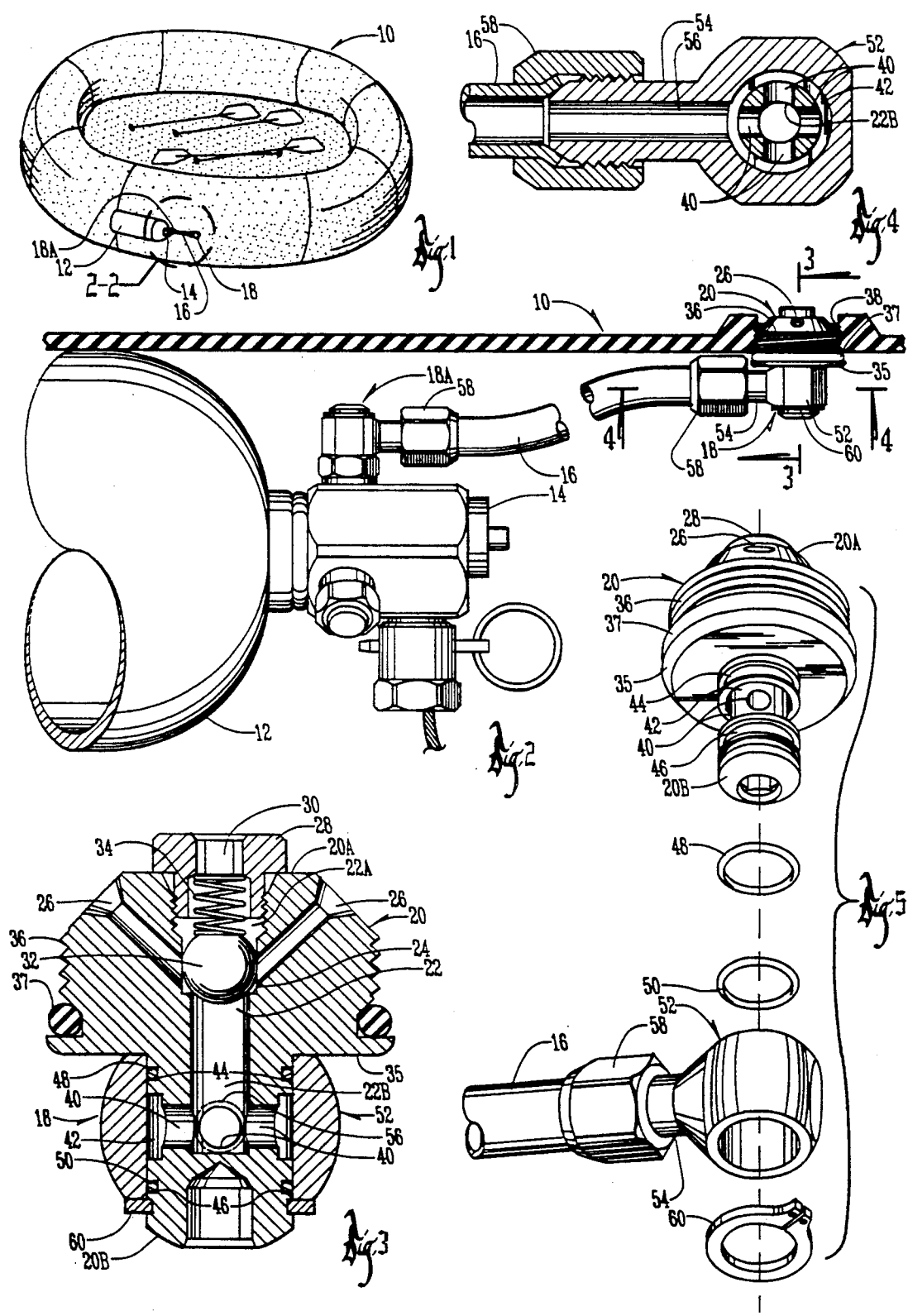

SWIVEL VALVE

BACKGROUND OF THE INVENTION

High pressure gas containers with releasable valves are commonly used for the inflation of life jackets, life rafts and the like. Gas pressures used in this equipment often are at the levels of 1500 p.s.i.-5000 p.s.i.

The environment of use of these high pressure containers requires them to be secured to a collapsed life raft, for example, for use in the event of an emergency. It is also necessary to have the high pressure valve connected to the interior of the life raft or the like by a flexible connection with swivel ends at opposite ends thereof to accommodate the movement of the life raft body with respect to the rigid construction of the high pressure gas container and the high pressure valve thereon.

Swivel valves used in gas or fluid circuits exist in the prior art but have certain inherent shortcomings. They often cannot swivel in a 360° arc which makes them unsuitable for certain applications. Further, they are not suitable for high pressure circuits since they cannot permit full flow of high pressure gas therethrough without somehow impeding the free swivel action of the swivel connections associated with the swivel valve.

It is therefore a principal object of this invention to provide a swivel valve that will freely swivel even under full flow of gas or fluid at extremely high pressures.

A further object of this invention is to provide a swivel valve which has a swivel capability of 360°.

A still further object of this invention is to provide a swivel valve which is adaptable for use under conditions of high or low pressure in a plurality of environments involving both gas or fluid circuits.

A still further object of this invention is to provide a swivel valve which is economical of manufacture, and which can be easily and quickly installed.

These and other objects will be apparent to those skilled in the art.

BRIEF SUMMARY OF THE INVENTION

The swivel valve of this invention comprises a valve body having an elongated bore with both the valve body and the bore having first and second ends. A gas or fluid port is located in the first end of the valve body and is in communication with the first end of the bore. At least one passageway extends from the second end of the bore and terminates in an annular groove extending around the outer surface of the valve body. A swivel connection is rotatably mounted on the valve body around said annular groove and has a passageway in communication with the annular groove. Sealing rings are located on opposite sides of the annular groove to prevent the escape of gas from the groove to the atmosphere between the swivel connection and the outer surface of the valve body. These sealing rings serve to balance the gas pressure exerted on the swivel connection and thereupon neutralize the movement of the swivel connection with respect to the annular groove. This prevents the gas pressure from binding the swivel connection with respect to the valve body and thereupon permits the swivel connection to freely rotate even when gas under high pressure is moving through the swivel connection and the valve body.

BRIEF DESCRIPTION OF THE DRAWINGS

FIG. 1 is a perspective view of a life raft with the device of this invention attached thereto;

FIG. 2 is an enlarged scale partial sectional view taken on line 2—2 of FIG. 1;

FIG. 3 is an enlarged scale sectional view taken on line 3—3 of FIG. 2;

FIG. 4 is an enlarged scale sectional view taken on line 4—4 of FIG. 2; and

FIG. 5 is an exploded view showing the components of the swivel valve of this invention.

DESCRIPTION OF THE PREFERRED EMBODIMENT

The environment of use of this invention is typically shown in FIG. 1 where an inflatable life raft 10 has a compressed gas container 12 secured thereto. A high pressure valve 14 is mounted on container 12 and is interconnected with the raft 10 by flexible hose 16. The raft is shown in its inflated condition after the valve 14 has been released to permit highly compressed gas from container 12 to flow through the valve 14 and hose 16 into the life raft 10. The details of valve 14 are disclosed in our co-pending application Ser. No. 07/745,941 filed Aug. 16, 1991. Hose 16 has one end connected to valve 14 by swivel valve 18A, and the other end of the hose is connected to raft 10 by a similar swivel valve 18. The valves 18 and 18A comprise the essence of the instant invention. These valves are identical except for a check valve that exists in valve 18 and which is not present in valve 18A, as will be described hereafter.

Swivel valve 18 is comprised of a valve body 20 which has an upper end 20A and a lower end 20B. An elongated bore 22 extends along the longitudinal axis of valve body 20. Bore 22 has an upper end 22A and a lower end 22B. A shoulder 24 appears towards the upper end of bore 22 and serves as a valve seat as will be described hereafter. Ports 26 extend diagonally through the upper end of valve body 28 and communicate with the upper end of bore 22. A port cap 28 with an aperture 30 therein is threadably inserted into the upper end of bore 22 as best shown in FIG. 3. A check valve assembly is positioned in the upper end of bore 22 and is comprised of a ball 32 which seats on shoulder 24 and closes ports 26 when in its seated position. A spring 34 normally holds ball 32 in its seated position. Spring 34 extends between the ball and the port cap 28 (FIG. 3). The upper end 20A of valve body 20 has an enlarged cross section with shoulder 35 generally dividing valve body 20 between its upper end 22A and its lower end 22. The outer surface of the upper end 20A of valve body 20 has threads 36, and O-ring 37 is positioned in an appropriate annular groove between shoulder 35 and the threads 36. The threads 36 are adapted to be received in the threaded female fitting 38 of the life raft 10, as shown in FIG. 2.

Four passageways 40 are drilled in the lower end 22A of valve body 20 in a radial direction, and the inner ends thereof communicate with the lower end 22B of bore 22. An annular groove 42 intersects the outer end of passageways 40 (FIG. 3). Annular grooves 44 and 46 are located on opposite sides of annular groove 44 to receive seal rings 48 and 50, respectively.

A swivel connection 52 is rotatably mounted on the lower end 22A of valve body 20 as best shown in FIG. 3. Swivel connection 52 has an elongated conduit 54 extending laterally therefrom and contains an elongated central passageway 56 which is in direct communication with the annular groove 42 in valve body 20. A hose fitting 58 is secured to the outer end of conduit 54 to tightly receive one end of flexible hose 16.

A snap ring 60 is located in groove 62 at the lower end 20B of valve body 20 as best shown in FIG. 3. The position of snap ring 60 in groove 62 is immediately adjacent the swivel connection 52 so as to rotatably confine the swivel connection 52 between the snap ring 60 and the shoulder 35 of valve body 20.

It should be understood that the valve 18A is identical to the valve 18 except that valve 18A does not have the check valve assembly therein comprised of the ball 32 and spring 34. By reason of the removable port cap 28, the ball 32 and spring 34 can be used or not, depending on the position in the gas circuit of the swivel valve and the desired function which the system needs.

It should be understood that while the swivel valve of the instant invention is primarily designed for use with high pressure gas circuits, it also has substantial utility with any hydraulic or gas circuit where above normal pressures are used. When the term "gas" is used herein, it is contemplated that the term has equal applicability to hydraulic fluids and the like.

When the high pressure valve 14 is actuated by the release cord 64, gas under extremely high pressure rushes from container 12, into the aperture 30 and ports 26 in the upper end 20A of valve body 20, thence through passageways 40 and annular groove 42, thence through passageway 56 and hose 16, thence into the passageway 56 of valve 18 on the other end of hose 16, thence into annular groove 42 and passages 40, and thence into and towards the upper end of bore 22. The gas pressure causes ball 32 to move upwardly as shown in FIG. 3 to compress spring 34, whereupon ports 26 are open to permit the gas to exit through the ports and enter the interior of raft 10.

A very important aspect of the instant invention is the location of the O-rings 48 and 50 on opposite sides of the annular groove 42. Without these O-rings, the gas under high pressure would have a tendency to escape to the atmosphere by migrating between the overlying surfaces of the swivel connection 52 and the outer surface of the lower end 20B of valve body 20. Rings 48 and 50 prevent this leakage from taking place in any important magnitude. If a seal ring was located only on one side of annular groove 42, the migration of escaping gases would throw swivel connection 52 into a state of imbalance. Thus, if only ring 48 were used, the gas pressure would likely blow the swivel 22 off of the lower end 20B of valve body 20 by severing or otherwise dislodging snap ring 60. If only ring 50 were used, the swivel 52 would be forced into tight contact with the shoulder 35 which would make rotation of the swivel connection 52 on the lower end 20A of valve body 20 virtually impossible, and at least extremely difficult. By placing the O-rings 48 and 50 on opposite sides of the annular groove 42, the swivel connection 52 is held in balance and remains free for easy rotation on the lower end of the valve body 20.

The construction and configuration of the valves 18 and 18A permit the swivel connections 52 thereon to be rotated in a 360° arc with respect to the valve bodies 20, thus enhancing the use thereof in a plurality of environments.

From the foregoing, it is seen that this invention will achieve at least its stated objectives.

I claim:

1. A swivel valve, comprising,
    a valve body having an elongated bore, with said valve body and said bore having first and second ends,
    a gas port in said first end of said valve body in communication with said first end of said bore,
    a first passageway extending from the second end of said bore and terminating in an annular groove extending around the outer surface of said second end of said valve body,
    a swivel connection rotatably mounted on said second end of said valve body, and having a second passageway in communication with said annular groove, whereupon gas can move between said second passageway and said bore through said annular groove and said first passageway,
    sealing means on opposite sides of said annular groove to prevent the escape of gas from said annular groove to the atmosphere between said swivel connection and said second end of said valve body, and to balance the gas pressure exerted on said swivel connection to neutralize movement of said swivel connection with respect to said annular groove, so as to permit said swivel connection to freely rotate with respect to said second end of said valve body, when gas under high pressure is moving through said bore and said swivel connection,
    said valve body being connected to the interior of an inflatable life saving device,
    and said second passageway in said swivel connection is connected to a source of releasable gas under pressure.

2. The swivel valve of claim 1 wherein a flexible conduit has a first end connected to said second passageway, and a second end connected to said source of releasable gas under pressure.

3. The swivel valve of claim 2 wherein said second end of said flexible conduit is connected to the second passageway of a second swivel valve identical to said first mentioned swivel valve, said second swivel valve being connected to said source of releasable gas under pressure.

* * * * *